2,988,083
FLUE SEALING MEANS FOR USE IN CONDUITS HAVING UNIDIRECTIONAL GAS FLOW

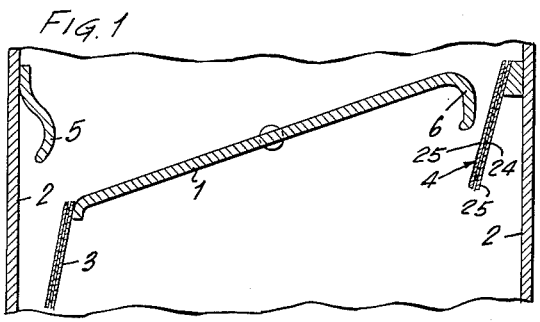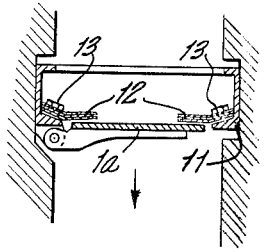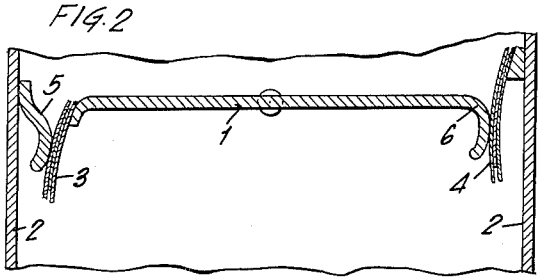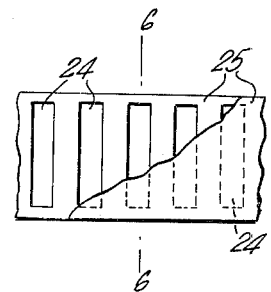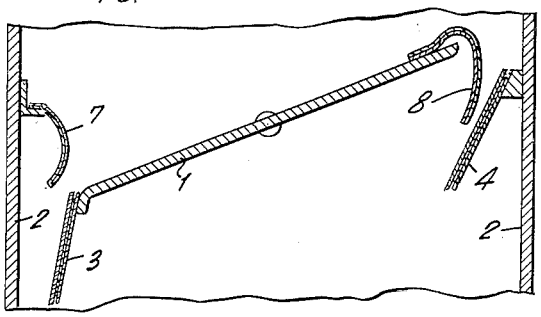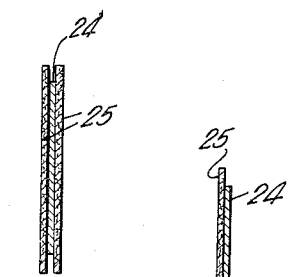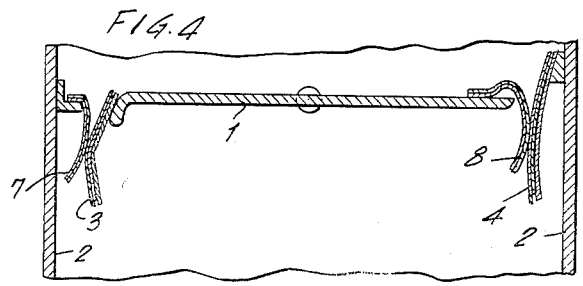

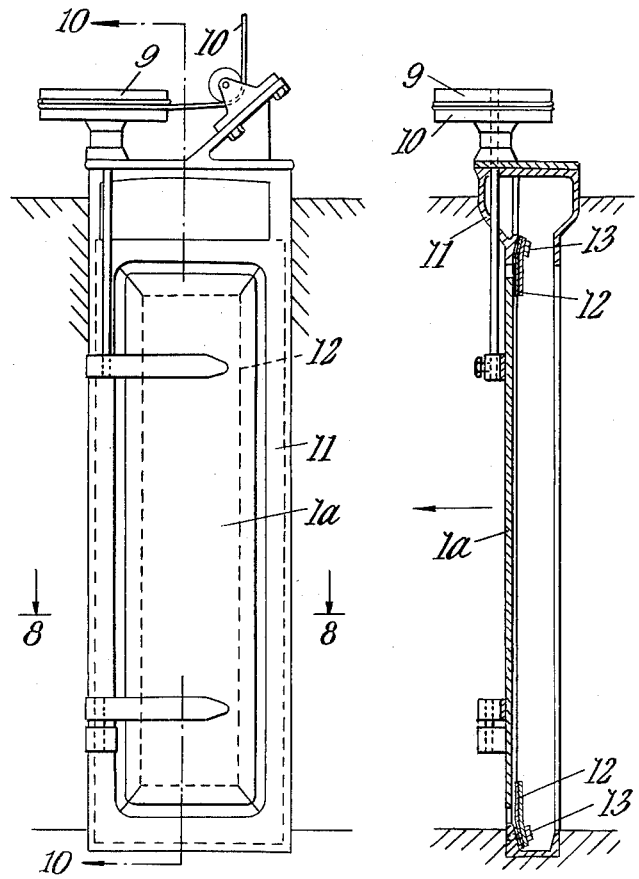

Ernest Lowe, London, England, assignor to Thermo-Technical Development Limited, London, England
Original application Aug. 28, 1952, Ser. No. 306,893, now Patent No. 2,846,999, dated Aug. 12, 1958. Divided and this application Aug. 11, 1958, Ser. No. 754,246
Claims priority, application Great Britain Sept. 12, 1951
3 Claims. (Cl. 126—285)

This invention relates to flue sealing equipment such as dampers, expansion seals and the like, of the kind in which a gas-tight seal between for example a damper element and its frame, or between one damper element and another, is obtained by using a heat-resisting flexible sealing material.

This is a divisional application derived from copending U.S. patent application Serial No. 306,893, filed August 28, 1952, now Patent No. 2,846,999, Aug. 12, 1958, for Flue Sealing Means for Use in Conduits Having Unidirectional Gas Flow.

It is a very important object of the present invention to provide means contributing to very efficacious fluid-tight sealing conditions between two or more cooperable heat resistant sealing elements within relative large size conduits or similar confines, enclosures and the like.

It is still another feature of this invention to provide means facilitating relative movement toward and conforming of said sealing elements with respect to each other for effecting highly desirable safe sealing conditions, as well as their movement or displacement from each other for allowing unimpeded passage of gases and fluids through said conduits and the like.

Yet another feature of the present invention is to provide means affording smooth and effortless cooperation of two or more relative flexible sealing elements and their adaptation to each other for sealing purposes without regard to the shape and dimensions of the cooperable surface of one of the sealing elements relative to the other sealing element, whereby a relative extensive face-to-face contact of said sealing elements is achieved.

Another feature of the present invention resides in the provision of means conducive to relatively light-weight, easily replaceable and durable, heat and wear resistant sealing structures, which are readily employable in many existing flues, conduits and like constructions without inordinately changing the cost of the latter.

Still a further object of the present invention resides in the provision of means envisaging the employment of normally even and flat, heat resistant and flexible or resilient sealing elements of relatively thin, sheet-forming stainless steel or steel alloy material, suitably dimensioned so as to be accurately adjusted to any profiled abutment surface for cooperation and for face-conforming contact therewith in quasi "three-dimensional fashion" to effectuate a very efficient seal.

According to the invention the flexible sealing member is formed at least in part of resilient material.

One margin of the flexible sealing member is firmly fixed, for example, to the damper or the frame as the case may be, thus forming an anchorage for the resilient material.

The resilient material will be pressed with a free end against the damper elements or the frame, as the case may be, and when fully closed will be deflected from its unstressed position. This will provide a gas-tight seal. The resilience of the material will thereby secure that the flexible component will follow its metal seating, even if damper or frame, for example may be distorted or misaligned as a consequence of extremely high heat conditions.

The resilient material is preferably embodied into or forms a flat resilient element or flat resilient elements, i.e. flat elements which resiliently return to their original flat shape when they are first bent and then again released.

Alternatively, the resilient material may comprise heat-resisting high duty alloy sheet. The sheet may be in the form of an elongated strip with its length parallel to the edge of the frame or damper element, or a plurality of strips of suitable form, conveniently rectangular or square, may be placed in overlapping relationship. This sectionalising, by using a plurality of spring strips, may in certain instances improve the sealing effect.

Preferably, the resilient strips would have their edges respectively inclined along and at right angles to the superposed edge-part of the damper element.

If a combination of metal strips and fabric are formed into a composite element, the strips may form at the same time a protective layer on the upstream side of the flexible component protecting the fabric from eroding effects of flue dust particles.

Alternatively, the metal strips may be placed between layers of heat-resisting fabric, which may be the preferred arrangement in cases where the gases are corrosive to the metal strips used, and where the fabric will thus protect the strips. When the fabric is exposed to the gases on the upstream side, it may be protected by a separate protective frame made from sheet metal or cast.

If composite flexible elements are used, combining metal strips with fabric, the fabric will generally be used to form the actual seal or packing against the rigid metal seating; the strips in this case will exert the necessary pressure against the fabric or packing.

The pressure of the strips and their deflection when fully closed, can be adapted to the operating conditions in each case, and to the maximum distortion of the framework and the damper which is expected. The strips can easily be adapted to stress limits which the resilient material used will withstand under the maximum temperature expected, by varying the width of the strips and their thickness.

If gas ducts have to be sealed under temperatures higher than mineral fabric can withstand the flexible components can be made wholly from metal, either by a continuous metal strip, or by overlapping of narrow segment strips, or by a combination of metal strips and wire fabric. This makes it possible to go to the highest temperature limits of the metal alloys made available by the latest metallurgical progress.

Normally, the strips should be applied so that they are deflected against the gas stream; that means that gas pressure and spring pressure combine to give a tight seal. This will permit the use of lower stressed strip elements. Where, however, a reversal of the gas flow direction can be expected, the strength of the strips can be increased sufficiently so that a counterstream will not open the spring seal.

In order to provide a wide and secure joint between strips and rigid seating, both may be curved with a wide radius. Furthermore, the strips used to form a protective layer for the fabric if fixed to the side of the damper blade opening upstream, can be curved at their free end and set at an angle so that when the damper is fully open they will protect the edge of the fabric from the impact of the moving gas particles.

In vertical or steeply inclined flues, the flexible component can be arranged to be inclined at an angle towards the flue axis steep enough for the flue dust not to find any hold on them. In addition, or alternatively, the outer margin of the damper and of the flexible component can be designed and arranged in such a way that the velocity of the gases is greatly increased when the damper seating approaches the frame-fixed flexible component, so that any flue dust accumulation on the component is cleared away.

In substantially horizontal flues, where flue dust interference is not serious, and where horizontal swivel elements are used, the bottom element may press against the flue bottom and by its deflection, make a tight seal without any other provision. Where flue dust interference is more serious, the swivel damper may be combined with a flue dust ejector (British Patent No. 601,726) and/or with steam nozzles. It may also be possible to combine vertical swivel elements equipped with flexible components according to the invention, with the suspended design, as described in British Patent No. 589,206, and the whole design with the packing methods as outlined in British Patent No. 565,714.

While the usual form of the application of the invention is to press a resilient flexible component against a rigid seating, it may in some cases be preferable to make a seal by letting two resilient components press against each other. It might also be possible to use flat strips for the sealing of the dampers by curving them sufficiently so that they can be deflected by squeezing them between the rigid seatings of the damper elements and/or the damper elements and the damper frame when the damper is closed to form a tight seal.

The flexible component principle thus described can be applied to a great variety of applications and designs. Some examples are outlined as follows:

A balanced swivel damper will normally have a flexible component attached to its side opening upstream, while the other side of the damper blade will form the seating for the other half of the flexible component, which is fixed to the damper frame.

Several of such balanced swivel elements may be combined into a louvre damper, which can be as equally applied to horizontal as to vertical flues. In horizontal flues the louvres may be of horizontal position or may form vertical elements.

In this, as in most other cases, the preferred design is to combine the swivel elements with a framework into a unit which is to be installed in the flue as a whole, except in very large installations which have to be assembled on site.

The flexible components can equally be applied to the actual butterfly dampers in rectangular as well as circular flues which open in the direction of the gas flue or against it.

Another application of this invention is in valve type dampers where the flexible component is wholly fixed to the frame and the damper element approaches the closing position and forms the actual seal, substantially in the direction of the flue axis, either in the gas flow direction or against it. The latter one will be the preferred arrangement, since it will combine gas and spring pressure for the actual sealing effect.

An example for this design is the application of this invention to smaller vertical flues, like the smoke boxes of economic boilers.

The invention will be further described with reference to the embodiments shown in the accompanying drawings.

FIGURES 1 and 2 each show diagrammatically two types of sealing arrangement, respectively, in the open and closed position.

FIGURES 3 and 4 each show diagrammatically further two types of sealing arrangement, respectively, in the open and closed position.

FIGURE 5 is an elevational view of a spring sealing element, and

FIGURE 6, a section of the line 6—6 of FIGURE 5 of the spring sealing element.

FIGURE 7 is a sectional view of a modified sealing element.

FIGURE 8 is a sectional view of a further alternative form of the invention as taken along line 8—8 in FIGURE 9.

FIGURE 9 is an elevational view of a gate-type horizontal flue damper; and, FIGURE 10 is a sectional view taken along line 10—10 in FIGURE 9.

In FIGURES 1 and 2, 1 indicates a swivel damper blade, 2 the flue walls, 3 and 4 the spring sealing elements, and 5 the abutments on the wall 2 for the left-hand sealing elements 3, and 6 the abutments on the swivel damper 1 for the right-hand sealing elements 4. These arrangements stress a spring against a rigid seating.

In FIGURES 3 and 4 similar references are used where applicable. Instead of the abutments 5 additional spring sealing elements 7 are provided on the left-hand walls 2 and similarly instead of the abutments 6, additional spring sealing elements 8 are provided on the swivel damper blade 1, thus stressing spring against spring.

It will be understood that the two sides of the damper blade are shown as sealed by different methods simply for the purpose of illustrating some of the various methods of sealing and that similar methods of sealing could be used at each side of the damper blade.

FIGURES 8, 9 and 10 show a gate type damper blade 1a which is operated from a pulley 9 by means of an operating wire 10. 11 indicates the damper framework. 12 indicates the resilient flexible sealing strips which are secured to the framework 11 by screws 13. The strips 12 overlap at the corners of the aperture in the framework and may also overlap along the long sides if these are too long for a single strip.

The arrow in FIGURES 8 and 10 indicates the direction of the gas flow.

In FIGURES 5 and 6 successively spaced-apart normally coplanar strips 24 of heat-resisting alloy sheet are secured between spaced layers 25 of a flexible heat-resisting textile material to from the heat-resisting flexible sealing material.

In FIGURE 7, the strips 24 are secured to the side of a single layer 25 of a flexible heat-resisting textile material. Generally the strip 24 would be on the upstream side of the flat resilient and flexible sealing means.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A flue sealing arrangement comprising a frame member having a passage and for installation in the flue, a damper member cooperating with the frame member to close the passage therethrough, thin flat heat-resisting flexible sealing means secured to one of said members along an edge thereof for cooperating via its flat face with the other member to form a gas-tight seal between said members by virtue of the spring pressure inherent in the flexible sealing means, said sealing means being formed at least in part of resilient material including spaced-apart parallel strips of heat-resisting alloy sheet secured to one side of a layer of flexible heat-resisting textile material and extending from substantially one edge of said layer to substantially the opposite edge of said layer, said strips extending parallel to each other and to said frame member and said damper member.

2. A flue sealing arrangement comprising a frame member having a passage and for installation in the flue, a damper member cooperating with the frame member to close the passage therethrough, thin flat heat-resisting flexible sealing means secured to one of said members along an edge thereof for cooperating via its flat face with the other member to form a gas-tight seal between said members by virtue of the spring pressure inherent in the flexible sealing means, said sealing means being formed at least in part of resilient material including spaced-apart thin strips of heat-resisting alloy sheet secured between two layers of a flexible heat-resisting textile material and extending from substantially two adjacent edges of said layers to substantially the opposite two edges of said layers, said strips extending parallel to each other and to said frame member and said damper member.

3. A device according to claim 1, including abutment means secured to one of said members, said abutment means being engageable and cooperating with said flexible sealing means.

References Cited in the file of this patent

UNITED STATES PATENTS

| | | |
|---|---|---|
| 1,443,000 | Briggs | Jan. 23, 1923 |
| 1,682,075 | Foulds | Aug. 28, 1928 |
| 1,883,983 | Lanyon | Oct. 25, 1932 |
| 2,846,999 | Lowenheim | Aug. 12, 1958 |

FOREIGN PATENTS

| | | |
|---|---|---|
| 364,454 | Germany | Nov. 24, 1922 |
| 656,748 | Germany | Nov. 7, 1933 |
| 453,477 | Great Britain | Sept. 11, 1936 |
| 536,314 | Great Britain | May 9, 1941 |
| 589,206 | Great Britain | June 13, 1947 |
| 602,949 | Great Britain | June 7, 1948 |